United States Patent
Chiang

(10) Patent No.: US 9,652,319 B2
(45) Date of Patent: May 16, 2017

(54) PROCESS RESCUE BY AN OS MODULE AFTER A DEVICE ERROR

(71) Applicant: MEDIATEK INC., Hsin-Chu (TW)

(72) Inventor: Tsung-Yueh Chiang, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 136 days.

(21) Appl. No.: 14/810,439

(22) Filed: Jul. 27, 2015

(65) Prior Publication Data

US 2017/0031748 A1    Feb. 2, 2017

(51) Int. Cl.
*G06F 11/07*    (2006.01)
*G06F 11/14*    (2006.01)

(52) U.S. Cl.
CPC ...... *G06F 11/0793* (2013.01); *G06F 11/0736* (2013.01); *G06F 11/0751* (2013.01); *G06F 11/1428* (2013.01); *G06F 11/1482* (2013.01)

(58) Field of Classification Search
CPC .......... G06F 11/0796; G06F 11/0793; G06F 11/07706; G06F 11/0703; G06F 11/0751; G06F 11/079; G06F 11/1415; G06F 11/1441; G06F 11/1482; G06F 11/1428
See application file for complete search history.

(56) References Cited

U.S. PATENT DOCUMENTS

| | | | | |
|---|---|---|---|---|
| 5,805,791 A * | 9/1998 | Grossman | ............ | G06F 11/142 714/23 |
| 9,207,877 B1 * | 12/2015 | McCloskey | ......... | G06F 11/1415 |
| 2002/0059310 A1 * | 5/2002 | Choi | .................. | G06F 11/0748 |
| 2006/0200702 A1 * | 9/2006 | Canning | ............. | G06F 11/0715 714/38.1 |
| 2007/0055914 A1 * | 3/2007 | Chandwani | ........... | G06F 11/008 714/47.2 |
| 2014/0281524 A1 * | 9/2014 | Legacy | ................... | H04L 67/10 713/168 |
| 2014/0372789 A1 * | 12/2014 | Arroyo | ............... | G06F 11/0712 714/4.5 |
| 2014/0372795 A1 * | 12/2014 | Graham | ............... | G06F 11/0712 714/15 |

* cited by examiner

*Primary Examiner* — Joseph Schell

(74) *Attorney, Agent, or Firm* — Han IP Corporation; Andy M. Han

(57) ABSTRACT

A method for performing process fault tolerant control of an electronic device, and an associated apparatus and an associated computer program product are provided, where the method includes: using at least one driver in a kernel layer of an operating system (OS) of the electronic device to perform detection to determine whether a specific process running on the electronic device will be influenced by an error of the electronic device; and when it is detected that the specific process running on the electronic device will be influenced by the error of the electronic device, using at least one control signal of the OS to perform process control on the specific process and using a package manager service (PMS) module of the OS to trigger a rescue procedure. For example, the method may further include: when triggering the rescue procedure, preventing immediately triggering termination of the specific process.

21 Claims, 7 Drawing Sheets

PROCESS RESCUE BY AN OS MODULE AFTER A DEVICE ERROR

BACKGROUND

The present invention relates to error control of processes (e.g. applications, or other types of software modules) running on an electronic device, and more particularly, to a method for performing process fault tolerant control of an electronic device, and an associated apparatus and an associated computer program product.

According to the related art, a conventional electronic device such as a conventional multifunctional mobile phone may run a conventional operating system (OS) to control operations of the conventional electronic device. Taking the Android™ architecture as an example of the conventional OS mentioned above, it may comprise a plurality of software modules, and can be divided into multiple layers of software modules, such as some software layers.

Although the conventional OS mentioned above may provide the conventional electronic device with various kinds of features and functionalities through many software modules, respectively, there is insufficient integration between the software layers such as that in the Android™ architecture and therefore some problems may occur in exceptional or unusual situations, causing inconvenience of the user of the conventional electronic device. For example, an application that is running on the conventional electronic device may need to access a removable storage device such as a memory card. In a situation where the removable storage device such as the memory card is unplugged, maybe due to a loose memory card slot or an unexpected user action, this application is typically forced to be terminated. In another example, an application that is running on the conventional electronic device may need to access an internal storage device of the conventional electronic device, such as a Flash memory within the conventional electronic device. In a situation where there is insufficient storage space in the internal storage device, this application is typically forced to be terminated. In another example, an application that is running on the conventional electronic device may need to access a network. In a situation where no network signal of the network can be detected, the access operation of this application is typically forced to be stopped. As a result of the conventional design of the conventional OS mentioned above, in any of the above situations, the user may feel bothered and/or upset. In addition, data loss and some associated side effects may be introduced.

In conclusion, the related art does not serve the user well. Thus, a novel method is required for improving the basic design architecture and enhancing the user experience with fewer side effects.

SUMMARY

It is an objective of the claimed invention to provide a method for performing process fault tolerant control of an electronic device, and an associated apparatus and an associated computer program product, in order to solve the above-mentioned problems.

It is another objective of the claimed invention to provide a method for performing process fault tolerant control of an electronic device, and an associated apparatus and an associated computer program product, in order to enhance the user experience for end-users with fewer side effects.

According to at least one preferred embodiment, a method for performing process fault tolerant control of an electronic device is provided, where the method comprises the steps of: using at least one driver in a kernel layer of an operating system (OS) of the electronic device to perform detection to determine whether a specific process running on the electronic device will be influenced by an error of the electronic device; and when it is detected that the specific process running on the electronic device will be influenced by the error of the electronic device, using at least one control signal of the OS to perform process control on the specific process and using a package manager service (PMS) module of the OS to trigger a rescue procedure. For example, the step of using the PMS module of the OS to trigger the rescue procedure may further comprise: when it is detected that the specific process running on the electronic device will be influenced by the error of the electronic device, using the PMS module of the OS to trigger the rescue procedure, rather than immediately triggering termination of the specific process.

According to at least one preferred embodiment, an apparatus for performing process fault tolerant control of an electronic device is provided, where the apparatus comprises at least one portion of the electronic device. The apparatus comprises a storage module arranged to store information for the electronic device, and further comprises a processing circuit arranged to control operations of the electronic device according to program instructions loaded from the storage module, where the processing circuit is coupled to the storage module. In addition, the processing circuit uses at least one driver in a kernel layer of an operating system (OS) of the electronic device to perform detection to determine whether a specific process running on the electronic device will be influenced by an error of the electronic device. Additionally, when it is detected that the specific process running on the electronic device will be influenced by the error of the electronic device, the processing circuit uses at least one control signal of the OS to perform process control on the specific process and uses a PMS module of the OS to trigger a rescue procedure. For example, when it is detected that the specific process running on the electronic device will be influenced by the error of the electronic device, the processing circuit uses the PMS module of the OS to trigger the rescue procedure, rather than immediately triggering termination of the specific process.

According to at least one preferred embodiment, a computer program product is provided, where the computer program product has program instructions for instructing a processor of an electronic device to perform a method comprising the steps of: using at least one driver in a kernel layer of an OS of the electronic device to perform detection to determine whether a specific process running on the electronic device will be influenced by an error of the electronic device; and when it is detected that the specific process running on the electronic device will be influenced by the error of the electronic device, using at least one control signal of the OS to perform process control on the specific process and using a PMS module of the OS to trigger a rescue procedure.

It is an advantage of the present invention that the present invention method, the associated apparatus, and the associated computer program product can enhance the user experience for end-users with fewer side effects. More particularly, the present invention method, the associated apparatus, and the associated computer program product can provide the user with a more robust and easier access to control the applications in various situations. In contrast to the related art, the present invention method, the associated apparatus, and the associated computer program product can prevent many problems of the conventional architecture (e.g. the application termination problem, and the data loss problem and some associated side effects).

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
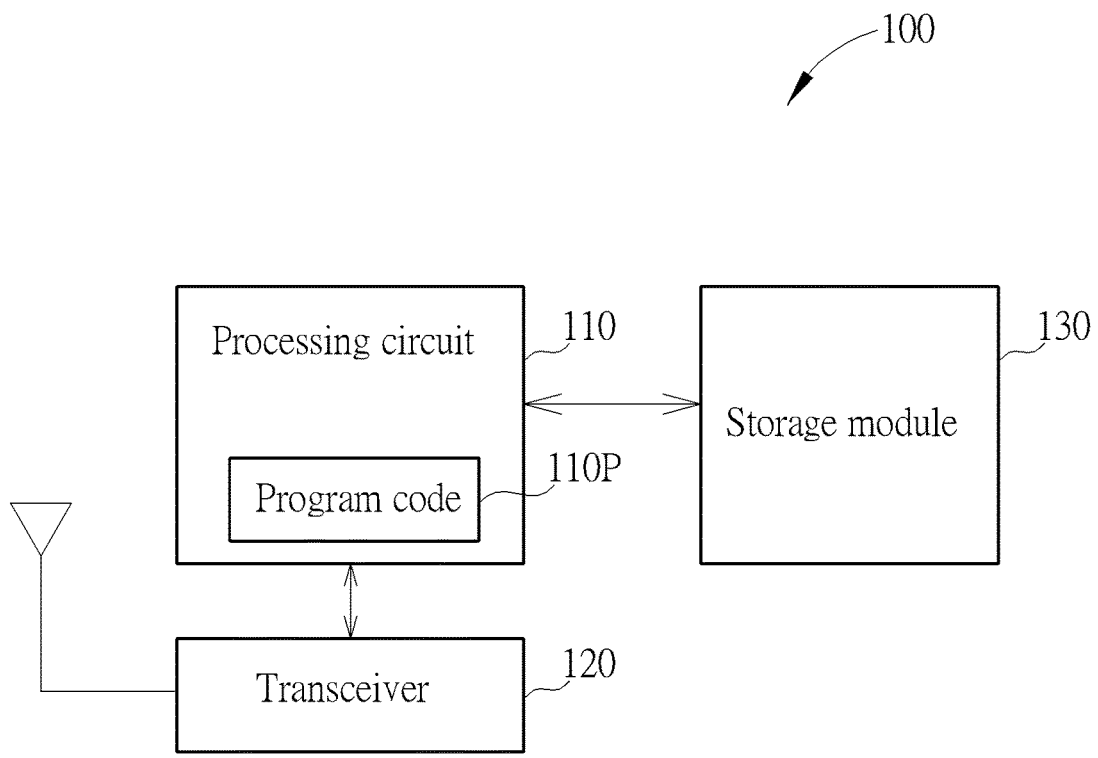
FIG. 1 is a diagram of an apparatus for performing process fault tolerant control of an electronic device according to a first embodiment of the present invention.

Please refer to FIG. 1, which illustrates a diagram of an apparatus 100 for performing process fault tolerant control of an electronic device according to a first embodiment of the present invention, where the apparatus 100 may comprise at least one portion (e.g. a portion or all) of the electronic device. For example, the apparatus 100 may comprise a portion of the electronic device mentioned above, and more particularly, can be at least one hardware circuit such as at least one integrated circuit (IC) within the electronic device. In another example, the apparatus 100 can be the whole of the electronic device mentioned above. In another example, the apparatus 100 may comprise a system comprising the electronic device mentioned above (e.g. an audio/video system comprising the electronic device). Examples of the electronic device may include, but not limited to, a mobile phone (e.g. a multifunctional mobile phone), a personal digital assistant (PDA), a tablet (or tablet computer), a wearable device and a personal computer such as a laptop computer or a desktop computer.

As shown in FIG. 1, the apparatus 100 may comprise a processing circuit 110 arranged to control operations of the electronic device, and may further comprise a transceiver 120 arranged to transmit and/or receive signal for the electronic device, where the transceiver 120 is coupled to the processing circuit 110, and one or more antennas of the electronic device may be coupled to the transceiver 120. For example, the processing circuit 110 may comprise at least one processor (e.g. one or more processors) and associated hardware resources, and the transceiver 120 may comprise a transmitter and a receiver such as those for wireless network communications, where the processor may execute some program codes 110P (e.g. program instructions). In another example, the apparatus 100 may further comprise a storage module 130 (e.g. a hard disk drive (HDD), or a non-volatile memory such as a Flash memory) arranged to store information for the electronic device, and the processing circuit 110 may be arranged to control the aforementioned operations of the electronic device according to the program codes 110P (e.g. program instructions) loaded (or retrieved) from the storage module 130.

In practice, the electronic device may comprise a touch sensitive display module (not shown in FIG. 1), where the touch sensitive display module may comprise a liquid crystal display (LCD) module (i.e., the LCM) and a touch panel (e.g. a transparent touch panel on the LCD module), both of which can be implemented according to the related art. For example, under control of the processing circuit 110, the apparatus 100 is capable of detecting touch gesture inputs of the user. This is for illustrative purposes only, and is not meant to be a limitation of the present invention.

According to this embodiment, the processing circuit 110 (for example, the processor mentioned above) may run an operating system (OS) (e.g. an altered version of an open source OS, such as an OS altered from the conventional architecture of Android™), and may further run a plurality of applications, where the program codes 110P may comprise at least one portion (e.g. a portion or all) of the OS, and may comprise at least one portion (e.g. a portion or all) of the plurality of applications. In addition, the OS may comprise a plurality of layers of software modules, where the plurality of applications may be within a specific layer of the plurality of layers, and the kernel of the OS may be within another layer of the plurality of layers. The OS of this embodiment is equipped with a process fault tolerant control mechanism (not shown in FIG. 1) that may comprise one or more control paths passing through at least one portion (e.g. a portion or all) of the plurality of layers, and therefore, the apparatus 100 can perform process fault tolerant control of the electronic device. For example, the apparatus 100 can perform process fault tolerant control of the electronic device with aid of control signals of the OS. This is for illustrative purposes only, and is not meant to be a limitation of the present invention.

Figure 2:
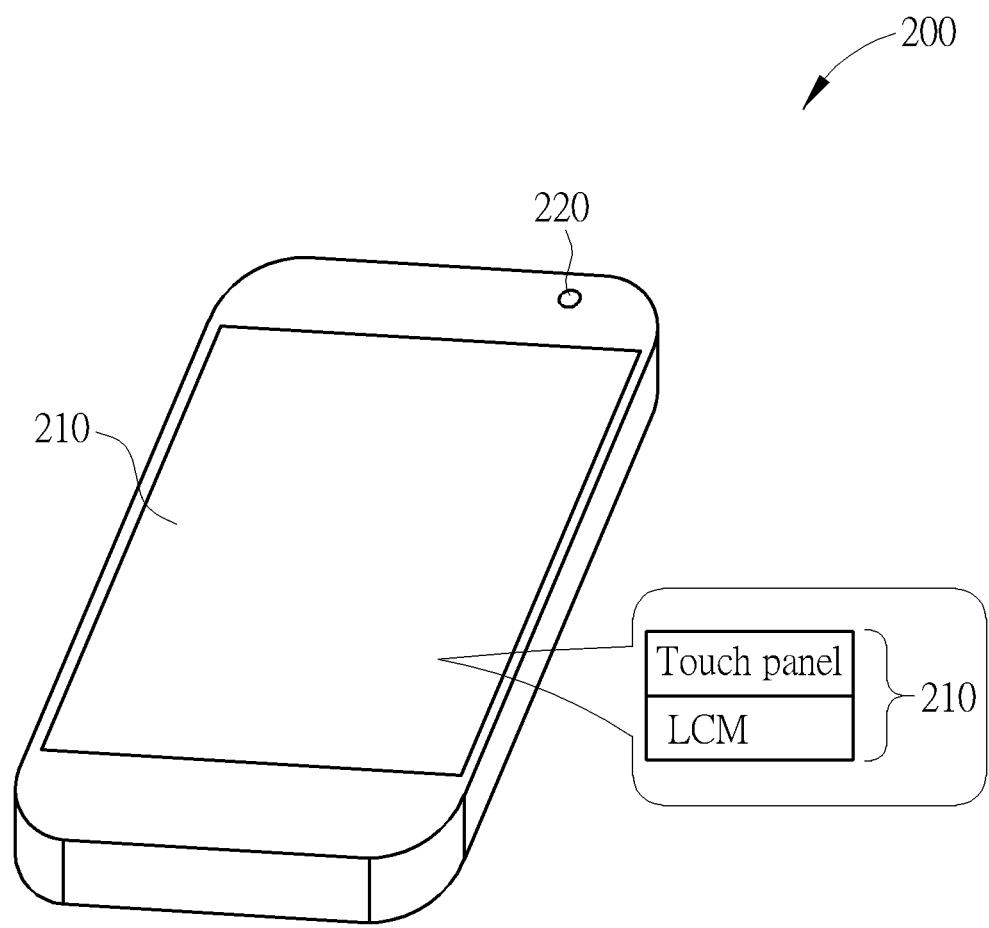
FIG. 2 illustrates a multifunctional mobile phone involved with the apparatus shown in FIG. 1 according to an embodiment of the present invention.

FIG. 2 illustrates a multifunctional mobile phone 200 involved with the apparatus 100 shown in FIG. 1 according to an embodiment of the present invention, where the multifunctional mobile phone 200 can be taken as an example of the electronic device mentioned above. As shown in FIG. 2, the multifunctional mobile phone 200 may comprise a touch sensitive display module 210 and a camera 220, where the touch sensitive display module 210 can be taken as an example of the touch sensitive display module mentioned above. This is for illustrative purposes only, and is not meant to be a limitation of the present invention.

Figure 3:
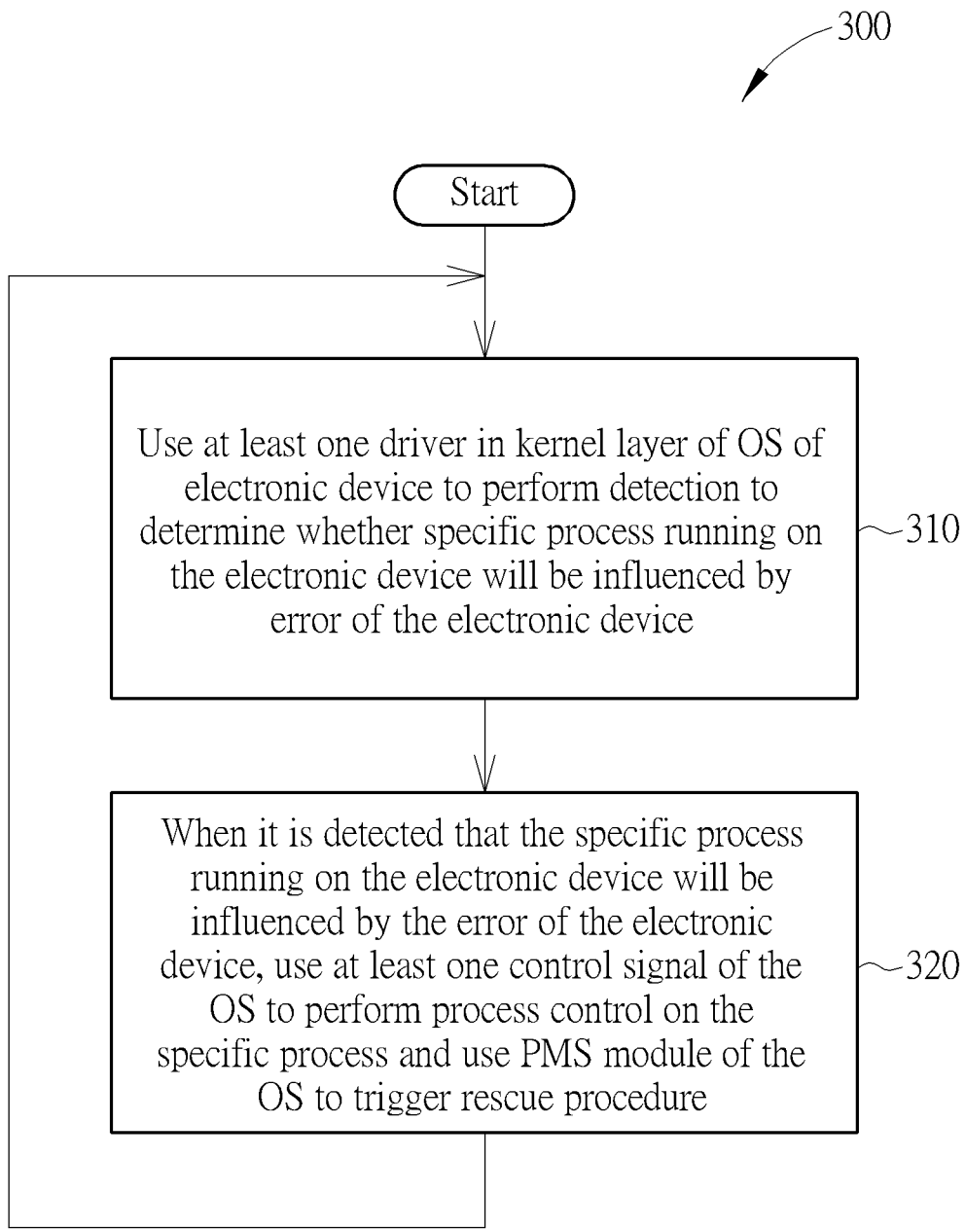
FIG. 3 illustrates a flowchart of a method for performing process fault tolerant control of an electronic device according to an embodiment of the present invention.

FIG. 3 illustrates a flowchart of a method 300 for performing process fault tolerant control of an electronic device such as that mentioned above according to an embodiment of the present invention. The method 300 shown in FIG. 3 can be applied to the apparatus 100 shown in FIG. 1 (for example, the multifunctional mobile phone 200 of the embodiment shown in FIG. 2), and can be applied to the processing circuit 110 thereof (for example, the processing circuit 110 executing the program codes 110P of the embodiment shown in FIG. 1). For example, the program code 110P may be provided through a computer program product having program instructions (such as those mentioned above) for instructing a processor such as that mentioned above to perform the method 300 shown in FIG. 3, where the computer program product may be implemented as a non-transitory computer-readable medium (e.g. a floppy disk or a compact disc-read only memory (CD-ROM)) storing the program instructions or an equivalent version thereof, such as a software package for being installed. This is for illustrative purposes only, and is not meant to be a limitation of the present invention. The method can be described as follows.

In Step 310, the processing circuit 110 may use at least one driver (e.g. one or more drivers) in a kernel layer of an OS of the electronic device, such as the OS mentioned in the embodiment shown in FIG. 1, to perform detection to determine whether a specific process running on the electronic device will be influenced by an error of the electronic device, where the kernel layer can be taken as an example of the other layer of the plurality of layers mentioned in the embodiment shown in FIG. 1. For example, the specific process can be a specific application within the plurality of applications mentioned in the embodiment shown in FIG. 1. This is for illustrative purposes only, and is not meant to be a limitation of the present invention. In some other examples, the specific process can be a specific software module within the plurality of layers of software modules mentioned in the embodiment shown in FIG. 1. In addition, no matter whether the specific process is one of the plurality of applications mentioned above or one of another types of software modules, the processing circuit 110 may use the aforementioned at least one driver (e.g. one or more drivers) in the kernel layer of the OS of the electronic device to perform detection to determine whether the error is corrected.

In Step 320, when it is detected that the specific process running on the electronic device will be influenced by the error of the electronic device, the processing circuit 110 may use at least one control signal (e.g. one or more control signals) of the OS to perform process control on the specific process and may use a package manager service (PMS) module of the OS to trigger a rescue procedure. For example, when it is detected that the specific process running on the electronic device will be influenced by the error of the electronic device, the processing circuit 110 can prevent immediately triggering termination of the specific process. That is, when it is detected that the specific process running on the electronic device will be influenced by the error of the electronic device, the processing circuit 110 may use the PMS module of the OS to trigger the rescue procedure, rather than immediately triggering termination of the specific process. For example, when it is detected that the specific process running on the electronic device will be influenced by the error of the electronic device, the processing circuit 110 may use the PMS module of the OS to trigger the rescue procedure, rather than immediately triggering termination of the specific process through an activity manager service (AMS) module of the OS. Please note that the terms "PMS" and "AMS" that are used for naming the PMS module and the AMS module, respectively, are well known in the art, so the definitions and the meanings of these terms "PMS" and "AMS" are not explained in detail here.

In practice, regarding performing detection to determine whether the specific process running on the electronic device will be influenced by the error of the electronic device in Step 310, the processing circuit 110 may be equipped with a database that indicates whether a process of a plurality of processes (e.g. any application of the plurality of applications mentioned in the embodiment shown in FIG. 1, or any software module within the plurality of layers of software modules mentioned in the embodiment shown in FIG. 1) will be influenced by a predefined error of a plurality of predefined errors, where the database can be positioned in, for example, the storage module 130 shown in FIG. 1. For example, the database can be a mapping table. In another example, the database can be a lookup table (LUT). In some other examples, the database can be any of other types of information contents that may indicate whether a process of the plurality of processes will be influenced by a predefined error of the plurality of predefined errors mentioned above. This is for illustrative purposes only, and is not meant to be a limitation of the present invention. In some examples, it is unnecessary to implement the database that collects various kinds of relationships between the plurality of processes and the plurality of predefined errors, respectively. In some examples, in a situation where the error of the electronic device in Step 310 is a specific predefined error within the plurality of predefined errors, when this error is detected, the aforementioned at least one driver may simply determine that the specific process running on the electronic device will be influenced by the error of the electronic device. Examples of the plurality of predefined errors may include, but not limited to, the error of removal of a memory card, the error of insufficient storage space, the error of no network signal, the error of weak network signal, etc.

Regarding performing process control on the specific process in Step 320, in a situation where the aforementioned at least one control signal comprise a plurality of control signals of the OS of the electronic device, the processing circuit 110 may use a specific control signal of the plurality of control signals (e.g. a control signal SIGSTOP such as that in a conventional Linux kernel) to suspend the specific process, and may use another control signal of the plurality of control signals (e.g. a control signal SIGCONT such as that in the conventional Linux kernel mentioned above) to resume the specific process. This is for illustrative purposes only, and is not meant to be a limitation of the present invention.

Please note that the operation of Step 310 and the operation of Step 320 are illustrated in FIG. 3, respectively. This is for illustrative purposes only, and is not meant to be a limitation of the present invention. According to some embodiments of the present invention, at least one other step can be added into the working flow shown in FIG. 3. According to some embodiments of the present invention, the working flow shown in FIG. 3 can be varied. For example, the working flow shown in FIG. 3 may be altered to come to the end when the operation of Step 320 is performed, where Step 310 is not re-entered. In some examples, the operation of Step 310 and/or the operation of Step 320 (e.g. the operation of Step 310, or the operation of Step 320, or the operation of Step 310 and the operation of Step 320) can be split into multiple sub-steps.

According to some embodiments when it is detected that the error is corrected, the processing circuit 110 may use the PMS module of the OS to update at least one external media status to guarantee the correctness of running the specific process. This is for illustrative purposes only, and is not meant to be a limitation of the present invention. According to some embodiments of the present invention, when it is detected that the error is corrected, the processing circuit 110 may use another module of the OS (for example, a software module of the OS) to update at least one external media status to guarantee the correctness of running the specific process.

According to some embodiments of the present invention, in a situation where the specific process mentioned in Step 310 is the specific application mentioned above, the specific process may typically be running in the foreground. This is for illustrative purposes only, and is not meant to be a limitation of the present invention. According to some embodiments of the present invention, no matter whether the specific process is running in the foreground or the background, the operations of the method 300 shown in FIG. 3 will not be hindered. For example, as a result of applying the method 300 shown in FIG. 3, when the error is detected, the apparatus 100 may suspend the specific process, and after triggering the rescue procedure to correct the error, the apparatus 100 may resume the specific process.

According to some embodiments of the present invention, during the rescue procedure, the processing circuit 110 may control a display module of the electronic device, such as the touch sensitive display module 210 shown in FIG. 2, to display hint information, where the hint information indicates the reason of the error, so as to guide the user of the electronic device to correct the error. For example, the hint information may indicate that a memory card is removed from the electronic device, and more particularly, may indicate that the memory card is removed from a memory card slot of the electronic device, so the hint information may guide the user to properly plug the memory card into the memory card slot of the electronic device. This is for illustrative purposes only, and is not meant to be a limitation of the present invention. In another example, the hint information may indicate that the memory card is loosed from the electronic device, and more particularly, may indicate that the memory card is loosed from the memory card slot of the electronic device, so the hint information may guide the user to properly plug the memory card into the memory card slot of the electronic device. In another example, the hint information may indicate that the memory card is not properly plugged into the electronic device, and more particularly, may indicate that the memory card is not properly plugged into the memory card slot of the electronic device, so the hint information may guide the user to properly plug the memory card into the memory card slot of the electronic device.

According to some embodiments of the present invention, during the rescue procedure, the processing circuit 110 may count down to wait for correction of the error and may control the display module of the electronic device (e.g. the touch sensitive display module 210) to display the associated count down information accordingly. For example, during the rescue procedure, when it is detected that the error is not corrected in time (e.g. the processing circuit 110 waits for a predetermined time interval, which may be measured from the time point when the error is detected), the processing circuit 110 may trigger termination of the specific process.

According to some embodiments of the present invention, during the rescue procedure, the processing circuit 110 may automatically perform a predetermined operation corresponding to the error to correct the error. For example, during the rescue procedure, the processing circuit 110 may control the display module of the electronic device (e.g. the touch sensitive display module 210) to display an error message, where the error message may indicate the error. In another example, during the rescue procedure, the processing circuit 110 may prevent the display module of the electronic device (e.g. the touch sensitive display module 210) from displaying an error message indicating the error.

According to some embodiments of the present invention, during the rescue procedure, the processing circuit 110 may control the display module of the electronic device (e.g. the touch sensitive display module 210) to display an error message such as that mentioned above, where the error message may indicate the error. In addition, during the rescue procedure, the processing circuit 110 may automatically clean up storage space of the electronic device (e.g. the storage space of an internal storage device of the electronic device, such as the storage module 130 mentioned in the embodiment shown in FIG. 1) to correct the error.

According to some embodiments of the present invention, during the rescue procedure, the processing circuit 110 may prevent the display module of the electronic device (e.g. the touch sensitive display module 210) from displaying an error message indicating the error, such as the error message mentioned above. In addition, during the rescue procedure, the processing circuit 110 may automatically clean up storage space of the electronic device (e.g. the storage space of the internal storage device of the electronic device, such as the storage module 130 mentioned above) to correct the error.

As described above, the control signal SIGSTOP such as that in the conventional Linux kernel can be taken as an example of the specific control signal of the plurality of control signals, and the control signal SIGCONT such as that in the conventional Linux kernel can be taken as an example of the other control signal of the plurality of control signals. This is for illustrative purposes only, and is not meant to be a limitation of the present invention. According to some variations of this embodiment, the processing circuit 110 may monitor other control signals of the plurality of control signals, such as other control signals in the conventional Linux kernel. Examples of the plurality of control signals may include, but not limited to, the signals described in the original POSIX.1-1990 standard, such as the signals SIGHUP, SIGINT, SIGQUIT, SIGILL, SIGABRT, SIGFPE, SIGKILL, SIGSEGV, SIGPIPE, SIGALRM, SIGTERM, SIGUSR1, SIGUSR2, SIGCHLD, SIGCONT, SIGSTOP, SIGTSTP, SIGTTIN, and SIGTTOU.

Figure 4:
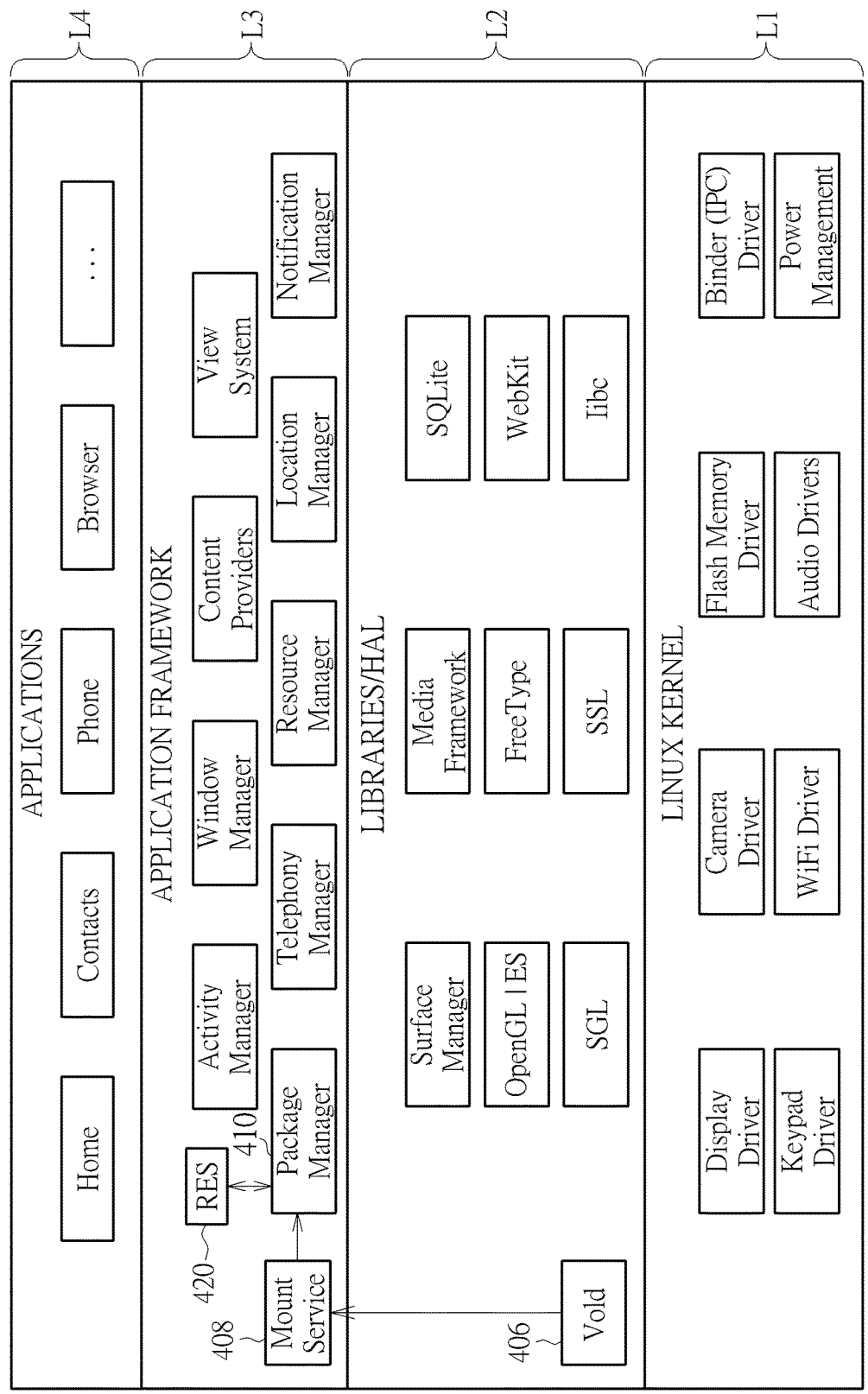
FIG. 4 illustrates a process fault tolerant control mechanism involved with the method shown in FIG. 3 according to an embodiment of the present invention.

FIG. 4 illustrates a process fault tolerant control mechanism involved with the method 300 shown in FIG. 3 according to an embodiment of the present invention. The software layers L1, L2, L3, and L4 can be taken as an example of the plurality of layers mentioned in the embodiment shown in FIG. 1, and can be referred to as the Linux kernel layer (labeled "LINUX KERNEL" in FIG. 4, for brevity), the library layer/hardware abstraction layer (labeled "LIBRARIES/HAL" in FIG. 4, for brevity), the application framework layer (labeled "APPLICATION FRAMEWORK" in FIG. 4, for brevity), and the applications layer (labeled "APPLICATIONS" in FIG. 4, for brevity), respectively, where the software layer L4 (i.e. the applications layer in this embodiment) can be taken as an example of the specific layer mentioned above, and the software layer L1 (i.e. the Linux kernel layer in this embodiment) can be taken as an example of the other layer mentioned above.

As shown in FIG. 4, the OS may comprise a volume daemon module 406 (labeled "Vold" in FIG. 4, for brevity) in the software layer L2 (i.e. the library layer/hardware abstraction layer in this embodiment), where the volume daemon module 406 can be regarded as a driver, and can be altered from the related art to make the volume daemon module 406 be capable of performing the aforementioned detection in Step 310. In addition, the OS may comprise amount service module 408 (labeled "Mount Service" in FIG. 4, for brevity), a PMS module 410 (labeled "Package Manager" in FIG. 4, for better comprehension), and a rescue module 420 (labeled "RES" in FIG. 4, for brevity) in the software layer L3 (i.e. the application framework layer in this embodiment), where the mount service module 408 can be implemented according to the related art to make the mount service module 408 be capable of communicating with the volume daemon module 406 of this embodiment and performing some control operations, the PMS module 410 can be taken as an example of the PMS module mentioned in Step 320, and the rescue module 420 can be used for performing the rescue procedure. Please note that the AMS module (labeled "Activity Manager" in FIG. 4, for better comprehension) in this embodiment can be taken as an example of the AMS module mentioned in the embodiment shown in FIG. 3. This is for illustrative purposes only, and is not meant to be a limitation of the present invention.

According to this embodiment, the PMS module 410 and the AMS module can be altered from the related art, where the relationship between the PMS module 410 and the AMS module is different from that in the related art. For example, in Step 320, when it is detected that the specific process running on the electronic device will be influenced by the error of the electronic device, the path that starts from the volume daemon module 406 and passes through the mount service module 408 and the PMS module 410 is not directed to the AMS module, so the processing circuit 110 can prevent immediately triggering termination of the specific process. As the path that starts from the volume daemon module 406 and passes through the mount service module 408 and the PMS module 410 can be directed to the rescue module 420 when the error is detected (for example, when it is detected that the specific process running on the electronic device will be influenced by the error of the electronic device), the rescue procedure can be triggered as mentioned above. As a result of the novel architecture shown in FIG. 4, the apparatus 100 can perform process fault tolerant control of the electronic device with aid of control signals of the OS mentioned above.

In addition, the software modules respectively labeled "Home", "Contacts", "Phone", and "Browser" in the software layer L4 (i.e. the applications layer in this embodiment) can be taken as examples of a portion of applications within the plurality of applications mentioned in the embodiment shown in FIG. 1, where the plurality of applications mentioned above may comprise some other software modules (labeled " . . . " in FIG. 4, for better comprehension) in the software layer L4.

In the architecture shown in FIG. 4, the software modules respectively labeled "Window Manager", "Content Providers", "View System", "Telephony Manager", "Resource Manager", "Location Manager", and "Notification Manager" in the software layer L3 (i.e. the application framework layer in this embodiment), the software modules respectively labeled "Surface Manager", "Media Framework", "SQLite", "OpenGL|ES", "FreeType", "WebKit", "SGL", "SSL", and "libc" in the software layer L2 (i.e. the library layer/hardware abstraction layer in this embodiment), and the software modules respectively labeled "Display Driver", "Camera Driver", "Flash Memory Driver", "Binder (IPC) Driver", "Keypad Driver", "WiFi Driver", "Audio Drivers", and "Power Management" in the software layer L1 (i.e. the Linux kernel layer in this embodiment) can be implemented according to the related art. This is for illustrative purposes only, and is not meant to be a limitation of the present invention. According to some embodiments of the present invention, at least one software module (e.g. one or more software modules) within the software modules listed above may be altered to guarantee the performance of the electronic device.

Figure 5:
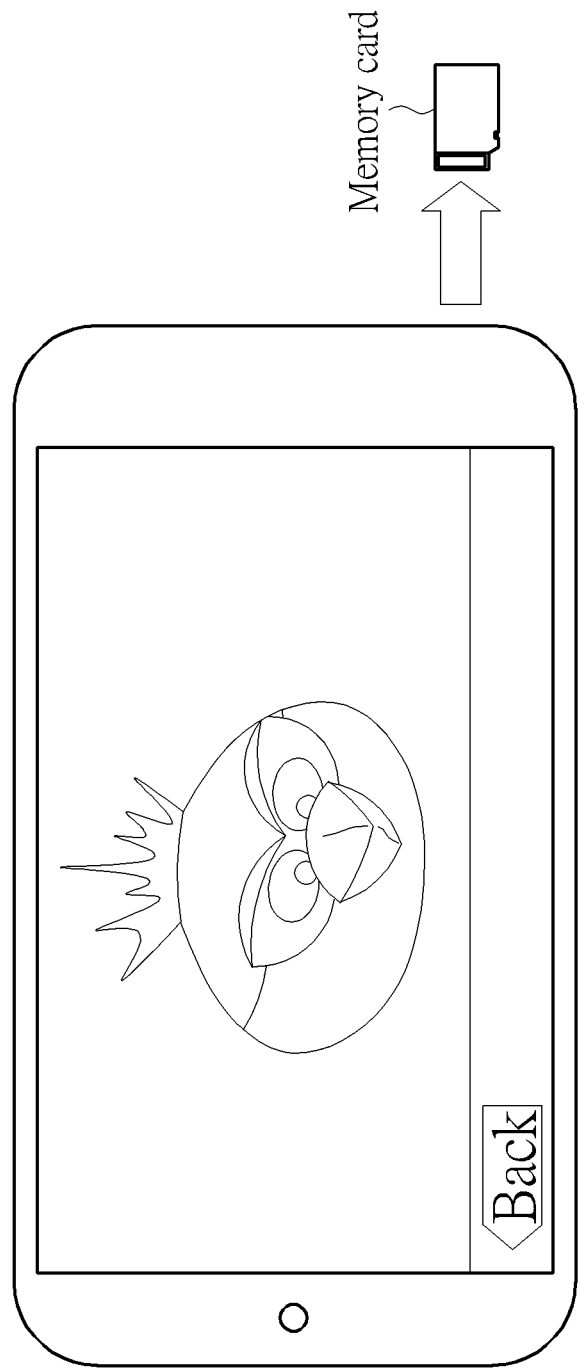
FIG. 5 illustrates a control scheme involved with the method shown in FIG. 3 according to an embodiment of the present invention.

FIG. 5 illustrates a control scheme involved with the method 300 shown in FIG. 3 according to an embodiment of the present invention, where the electronic device of this embodiment may comprise a memory card slot such as that mentioned above. For example, the memory card of this embodiment can be a Security Digital (SD) memory card, which can also be referred to as the SD card, for brevity. In this embodiment, the memory card such as the SD card may be unintentionally removed (or unplugged) from the memory card slot. The reasons why the memory card may be unintentionally removed (or unplugged) from the memory card slot may include, but not limited to, external force applied to the memory card and/or the electronic device. For example, during playing game by using the electronic device, the user may unintentionally touch the outmost portion of the memory card, to apply the external force to the memory card. In another example, during playing game by using the electronic device, the user may unintentionally (or intentionally) shake the electronic device, so that the electronic hits against something else, to cause the external force to be applied to the memory card and/or the electronic device. In another example, during playing game by using the electronic device, the user may unintentionally (or intentionally) drop the electronic device onto the floor, to cause the external force to be applied to the memory card and/or the electronic device, where a shock may lead to temporary malfunction of a certain holding mechanism within the memory card slot.

Please note that removing (or unplugging) the memory card such as the SD card from the memory card slot may influence the specific process running on the electronic device since some important data may be stored in the memory card. For example, the specific process running on the electronic device may need to use the important data in the memory card, so removing (or unplugging) the memory card such as the SD card from the memory card slot may hinder normal operations of the specific process running on the electronic device. In addition, the specific process running on the electronic device may need to write data into the memory card such as the SD card. As the non-volatile memory within the SD card is typically implemented with the Flash memory, which may be damaged due to power failure of the SD card if an internal writing procedure of the SD card is not completed, removing (or unplugging) the memory card such as the SD card from the memory card slot may trigger a system alert based on some implementations.

According to this embodiment, the kernel of the OS (more particularly, the aforementioned at least one driver, which may run on the processing circuit 110) may detect that the memory card (e.g. the SD card) is removed and sends the control signal SIGSTOP to the specific process such as the specific application. For example, when it is detected that the specific process running on the electronic device will be influenced by the error of the electronic device, the aforementioned at least one driver such as the volume daemon module 406 may notify the mount service module 408 and the PMS module 410 of this detection result, and therefore, the mount service module 408 (more particularly, the sub-module MountService.unmountVolume( ) therein) may perform an unmount operation, and the PMS module 410 (more particularly, the sub-module PMS.updateExternalMediaStatus( ) therein) may update at least one external media status regarding the memory card. Please note that the PMS module 410 does not trigger any operation of the AMS module shown in FIG. 4 (more particularly, the sub-module AMS.forcestop( ) therein) at this moment, and therefore can prevent triggering termination of the specific process. Thus, when it is detected that the specific process running on the electronic device will be influenced by the error of the electronic device, the processing circuit 110 may use the PMS module 410 to trigger the rescue procedure 420, rather than immediately triggering termination of the specific process. For example, when it is detected that the specific process running on the electronic device will be influenced by the error of the electronic device, the processing circuit 110 may use the PMS module 410 to trigger the rescue procedure 420, rather than immediately triggering termination of the specific process through the AMS module shown in FIG. 4. For brevity, similar descriptions for this embodiment are not repeated in detail here.

Figure 6:
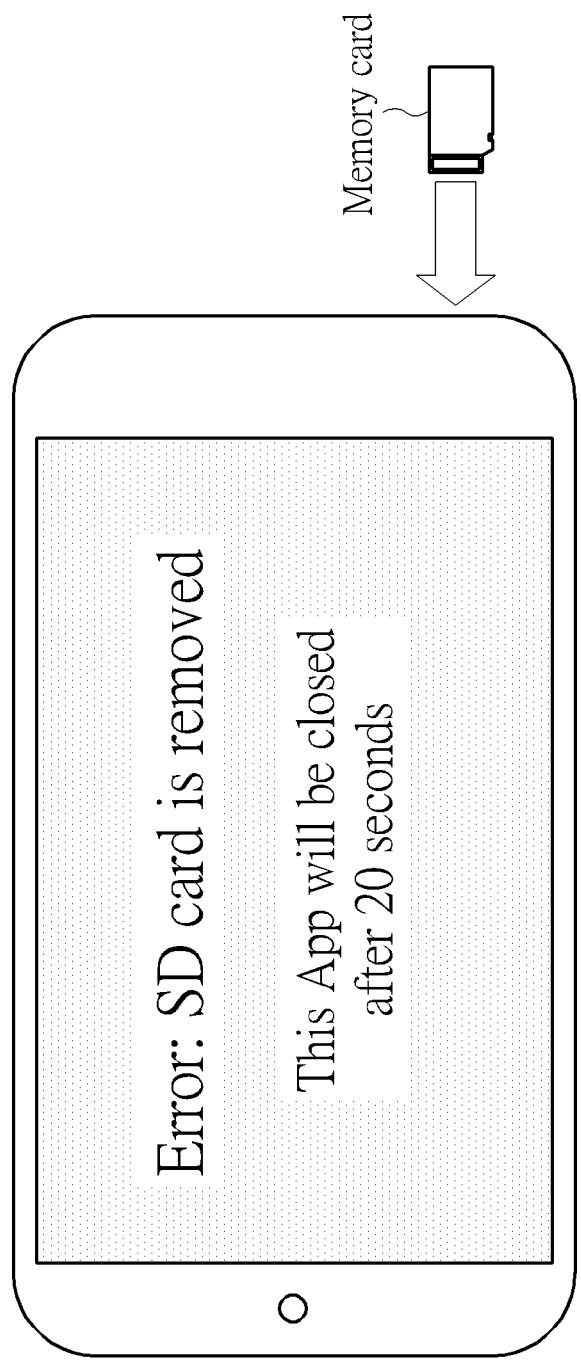
FIG. 6 illustrates some implementation details of the control scheme shown in FIG. 5 according to an embodiment of the present invention.

FIG. 6 illustrates some implementation details of the control scheme shown in FIG. 5 according to an embodiment of the present invention, where the electronic device of this embodiment may comprise the memory card slot mentioned above. As shown in FIG. 6, during the rescue procedure, the processing circuit 110 may control the display module of the electronic device, such as the touch sensitive display module 210 shown in FIG. 2, to display the aforementioned hint information such as the text string "Error: SD card is removed", which indicates the reason of the error mentioned above, so as to guide the user of the electronic device to correct the error by inserting (or plugging) the memory card of this embodiment (e.g. the SD card) into the memory card slot. As the hint information may indicate that the SD card is removed from the electronic device, and for example, indicate that the SD card is removed from the memory card slot of the electronic device, the hint information may guide the user to properly plug the SD card into the memory card slot of the electronic device.

In addition, during the rescue procedure, the processing circuit 110 may count down to wait for correction of the error and may control the display module of the electronic device (e.g. the touch sensitive display module 210) to display the associated count down information accordingly, such as the text string "This App will be closed after 20 seconds", where the number of seconds may vary as time goes by to reflect the remaining time until the predetermined time interval is expired. For example, during the rescue procedure, when it is detected that the error is corrected in time (e.g. the processing circuit 110 waits for a time interval that is shorter than the predetermined time interval, since the time point when the error is detected), the processing circuit 110 may use the other control signal of the plurality of control signals mentioned above (e.g. the control signal SIGCONT mentioned above) to resume the specific process. This is for illustrative purposes only, and is not meant to be a limitation of the present invention. In another example, during the rescue procedure, when it is detected that the error is not corrected in time (e.g. the processing circuit 110 waits for the predetermined time interval, which may be measured from the time point when the error is detected), the processing circuit 110 may trigger termination of the specific process.

According to this embodiment, the kernel of the OS (more particularly, the aforementioned at least one driver, which may run on the processing circuit 110) may detect that the memory card (e.g. the SD card) is inserted and sends the control signal SIGCONT to the specific process such as the specific application. For example, when it is detected that the error is corrected, the aforementioned at least one driver such as the volume daemon module 406 may notify the mount service module 408 and the PMS module 410 of this detection result, and therefore, the mount service module 408 (more particularly, the sub-module MountService.mountVolume( ) therein) may perform a mount operation, and the PMS module 410 (more particularly, the sub-module PMS.updateExternalMediaStatus( ) therein) may update at least one external media status regarding the memory card. For brevity, similar descriptions for this embodiment are not repeated in detail here.

Figure 7:
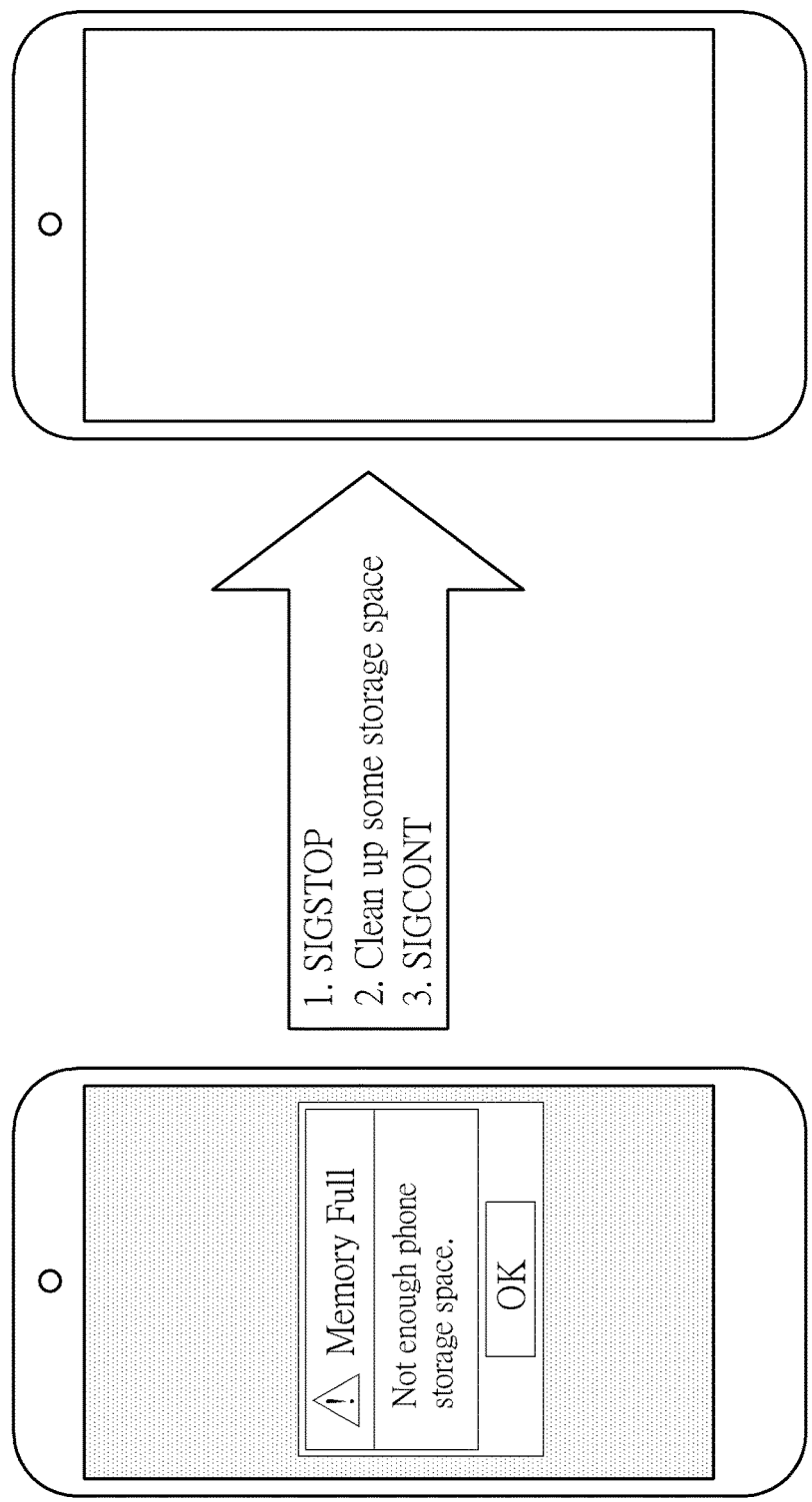
FIG. 7 illustrates a control scheme involved with the method shown in FIG. 3 according to another embodiment of the present invention.

FIG. 7 illustrates a control scheme involved with the method 300 shown in FIG. 3 according to another embodiment of the present invention. For example, the specific process may be downloading a file. This is for illustrative purposes only, and is not meant to be a limitation of the present invention. In another example, the specific process may be upgrading a program. In another example, the specific process may be recording a video clip. In another example, the specific process may be recording an audio clip. In another example, the specific process may be performing file format conversion.

According to this embodiment, during the rescue procedure, the processing circuit 110 may automatically perform the predetermined operation corresponding to the error, and more particularly, may automatically clean up the storage space of the electronic device (e.g. the storage space of the internal storage device of the electronic device, such as the storage module 130 mentioned above), to correct the error. For example, the processing circuit 110 may first send the control signal SIGSTOP to suspend the specific process (labeled "1. SIGSTOP" in FIG. 7, for brevity), and then clean up the storage space of the electronic device (labeled "2. Clean up some storage space" in FIG. 7, for brevity), and further send the control signal SIGCONT to resume the specific process (labeled "3. SIGCONT" in FIG. 7, for brevity). This is for illustrative purposes only, and is not meant to be a limitation of the present invention.

In addition, during the rescue procedure, the processing circuit 110 may control the display module of the electronic device (e.g. the touch sensitive display module 210) to display an error message such as any of the text strings "Memory Full" and "Not enough phone storage space" shown in FIG. 7, where any of these strings may indicate the error. For brevity, similar descriptions for this embodiment are not repeated in detail here.

In the embodiment shown in FIG. 7, the processing circuit 110 may control the display module of the electronic device (e.g. the touch sensitive display module 210) to display the error message such as any of the text strings "Memory Full" and "Not enough phone storage space" shown in FIG. 7. This is for illustrative purposes only, and is not meant to be a limitation of the present invention. According to some embodiments of the present invention, during the rescue procedure, the processing circuit 110 may prevent the display module of the electronic device (e.g. the touch sensitive display module 210) from displaying an error message indicating the error, such as the error message mentioned above (e.g. any of the text strings "Memory Full" and "Not enough phone storage space" shown in FIG. 7). For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing process fault tolerant control of an electronic device, the method comprising:
    using at least one driver in a kernel layer of an operating system (OS) of the electronic device to perform a detection to determine whether a specific process running on the electronic device will be influenced by an error of the electronic device; and
    when it is detected that the specific process running on the electronic device will be influenced by the error of the electronic device, using at least one control signal of the OS to perform process control on the specific process and using a package manager service (PMS) module of the OS to trigger a rescue procedure.

2. The method of claim 1, further comprising:
    using the at least one driver in the kernel layer of the OS of the electronic device to perform a detection to determine whether the error is corrected.

3. The method of claim 2, further comprising:
    when it is detected that the error is corrected, using the PMS module of the OS to update at least one external media status to guarantee a correctness of running the specific process.

4. The method of claim 1, wherein the using of the PMS module of the OS to trigger the rescue procedure further comprises:
    when it is detected that the specific process running on the electronic device will be influenced by the error of the electronic device, using the PMS module of the OS to trigger the rescue procedure, rather than immediately triggering termination of the specific process.

5. The method of claim 4, wherein the using of the PMS module of the OS to trigger the rescue procedure further comprises:
    when it is detected that the specific process running on the electronic device will be influenced by the error of the electronic device, using the PMS module of the OS to trigger the rescue procedure, rather than immediately triggering termination of the specific process through an activity manager service (AMS) module of the OS.

6. The method of claim 1, further comprising:
    during the rescue procedure, controlling a display module of the electronic device to display hint information, wherein the hint information indicates a reason of the error.

7. The method of claim 6, further comprising:
    during the rescue procedure, counting down to wait for correction of the error and controlling the display module of the electronic device to display count down information accordingly; and
    during the rescue procedure, when it is detected that the error is not corrected in time, triggering a termination of the specific process.

8. The method of claim 1, further comprising:
    during the rescue procedure, automatically performing a predetermined operation corresponding to the error to correct the error.

9. The method of claim 8, further comprising:
    during the rescue procedure, controlling a display module of the electronic device to display an error message, wherein the error message indicates the error; and
    during the rescue procedure, automatically cleaning up storage space of the electronic device to correct the error.

10. The method of claim 8, further comprising:
    during the rescue procedure, preventing a display module of the electronic device from displaying an error message indicating the error; and
    during the rescue procedure, automatically cleaning up storage space of the electronic device to correct the error.

11. An apparatus for performing process fault tolerant control of an electronic device, the apparatus comprising at least one portion of the electronic device, the apparatus comprising:
    a storage module arranged to store information for the electronic device; and
    a processing circuit, coupled to the storage module, arranged to control operations of the electronic device according to program instructions loaded from the storage module, wherein the processing circuit uses at least one driver in a kernel layer of an operating system (OS) of the electronic device to perform detection to determine whether a specific process running on the electronic device will be influenced by an error of the electronic device, wherein when it is detected that the specific process running on the electronic device will be influenced by the error of the electronic device, the processing circuit uses at least one control signal of the OS to perform process control on the specific process and uses a package manager service (PMS) module of the OS to trigger a rescue procedure.

12. The apparatus of claim 11, wherein the processing circuit uses the at least one driver in the kernel layer of the OS of the electronic device to perform a detection to determine whether the error is corrected.

13. The apparatus of claim 12, wherein when it is detected that the error is corrected, the processing circuit uses the PMS module of the OS to update at least one external media status to guarantee a correctness of running the specific process.

14. The apparatus of claim 11, wherein when it is detected that the specific process running on the electronic device will be influenced by the error of the electronic device, the processing circuit uses the PMS module of the OS to trigger the rescue procedure, rather than immediately triggering termination of the specific process.

15. The apparatus of claim 14, wherein when it is detected that the specific process running on the electronic device will be influenced by the error of the electronic device, the processing circuit uses the PMS module of the OS to trigger the rescue procedure, rather than immediately triggering termination of the specific process through an activity manager service (AMS) module of the OS.

16. The apparatus of claim 11, wherein during the rescue procedure, the processing circuit controls a display module of the electronic device to display hint information, wherein the hint information indicates a reason of the error.

17. The apparatus of claim 16, wherein during the rescue procedure, the processing circuit counts down to wait a for correction of the error and controls the display module of the electronic device to display count down information accordingly; and during the rescue procedure, when it is detected that the error is not corrected in time, the processing circuit triggers a termination of the specific process.

18. The apparatus of claim 11, wherein during the rescue procedure, the processing circuit automatically performs a predetermined operation corresponding to the error to correct the error.

19. The apparatus of claim 18, wherein during the rescue procedure, the processing circuit controls a display module of the electronic device to display an error message, wherein the error message indicates the error; and during the rescue procedure, the processing circuit automatically cleans up storage space of the electronic device to correct the error.

20. The apparatus of claim 18, wherein during the rescue procedure, the processing circuit prevents a display module of the electronic device from displaying an error message indicating the error; and during the rescue procedure, the processing circuit automatically cleans up storage space of the electronic device to correct the error.

21. A computer program product comprising a non-transitory media, having program instructions for instructing a processor of an electronic device to perform a method comprising the steps of:

using at least one driver in a kernel layer of an operating system (OS) of the electronic device to perform a detection to determine whether a specific process running on the electronic device will be influenced by an error of the electronic device; and when it is detected that the specific process running on the electronic device will be influenced by the error of the electronic device, using at least one control signal of the OS to perform process control on the specific process and using a package manager service (PMS) module of the OS to trigger a rescue procedure.

* * * * *